U S009449434B2

(12) United States Patent
Mullner et al.

(10) Patent No.: US 9,449,434 B2
(45) Date of Patent: Sep. 20, 2016

(54) ELECTRICALLY ACTUATABLE MODULE OF A MOTOR VEHICLE AND METHOD FOR IDENTIFYING AN ELECTRICALLY ACTUATABLE MODULE OF A MOTOR VEHICLE

(71) Applicant: Magna Powertrain AG & CO KG, Lannach (AT)

(72) Inventors: Gerhard Mullner, Markt Hartmannsdorf (AT); Karl Reisinger, Graz (AT); Ralf Schwarz, Ingolstadt (DE); Tim-Christopher Meissner, Ingolstadt (DE); Maik Hofmann, Galmersheim (DE); Thomas Ferstl, Ingolstadt (DE)

(73) Assignee: Magna Powertrain AG & Co KG, Lannach (AT)

( * ) Notice: Subject to any disclaimer, the term of this patent is extended or adjusted under 35 U.S.C. 154(b) by 0 days.

(21) Appl. No.: 14/144,141

(22) Filed: Dec. 30, 2013

(65) Prior Publication Data
US 2014/0114543 A1 Apr. 24, 2014

Related U.S. Application Data

(63) Continuation of application No. 12/999,780, filed as application No. PCT/EP2009/004492 on Jun. 22, 2009, now abandoned.

(30) Foreign Application Priority Data

Jun. 25, 2008 (DE) ...................... 10 2008 030 0926

(51) Int. Cl.
G07C 5/08 (2006.01)
G07C 5/00 (2006.01)
B60W 50/00 (2006.01)

(52) U.S. Cl.
CPC ............ *G07C 5/00* (2013.01); *B60W 50/0098* (2013.01)

(58) Field of Classification Search
USPC ...... 701/51, 36, 37, 41, 45, 29.1, 29.6, 29.7, 701/33.1, 34.4, 29.9, 59, 60, 63, 66, 67, 69, 701/81, 84, 85, 87, 89; 477/5, 8, 13, 39
See application file for complete search history.

(56) References Cited

U.S. PATENT DOCUMENTS 4,839,812 A * 6/1989 Nusser et al. ............... 701/33.9
4,972,293 A 11/1990 Verner
(Continued)

FOREIGN PATENT DOCUMENTS

DE 10020977 A1 10/2001
DE 10110729 A1 7/2002
(Continued)

OTHER PUBLICATIONS

International Search Report, mail dated Oct. 19, 2009. issued in corresponding Patent Cooperation Treaty (PCT) Application No. PCT/EP2009/004492, filed Jun. 22, 2009.

*Primary Examiner* — Thomas Tarcza
*Assistant Examiner* — Richard Goldman
(74) *Attorney, Agent, or Firm* — Dickinson Wright PLLC

(57) ABSTRACT

The invention relates to an electrically actuatable assembly of a motor vehicle having at least one component comprising a non-volatile memory. The component has base functionality characteristic for the component and required for the operation of the assembly. The memory comprises a memory region not utilized for realizing the base functionality of the component, in said memory region is stored a characteristic value that identifies the assembly with a predetermined probability. Furthermore, the characteristic value can be read out from the memory region of the component. Finally, the invention describes a method for identifying such an electrically actuatable assembly.

22 Claims, 2 Drawing Sheets

(56) References Cited

U.S. PATENT DOCUMENTS

Figure 1:
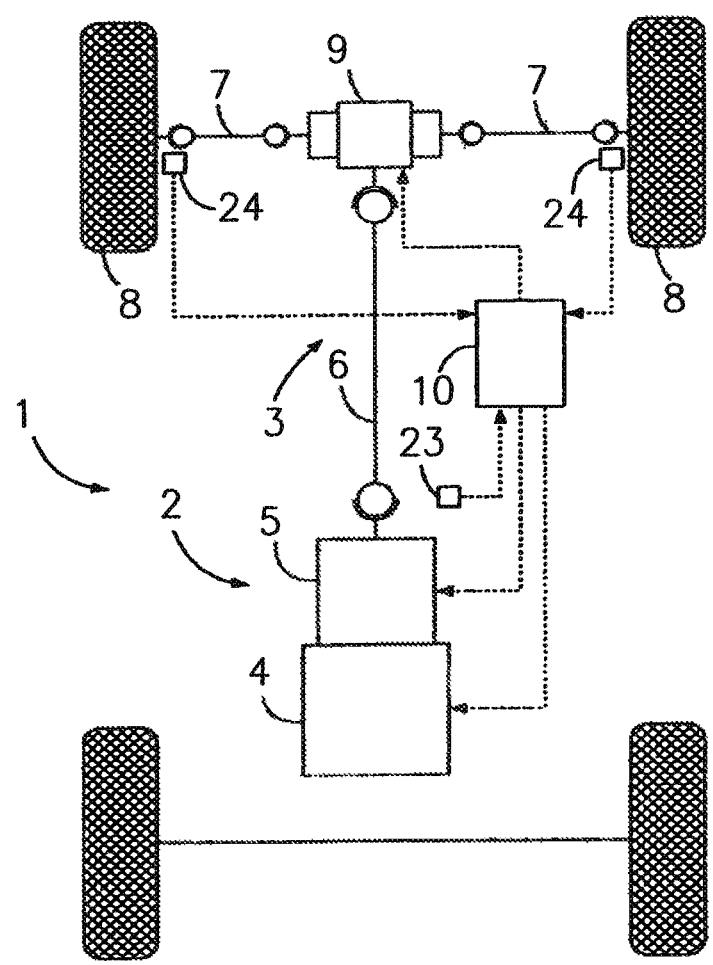

| | | | |
|---|---|---|---|
| 5,394,327 A * | 2/1995 | Simon et al. | 701/1 |
| 5,491,631 A * | 2/1996 | Shirane et al. | 701/29.6 |
| 5,552,789 A * | 9/1996 | Schuermann | 340/5.21 |
| 5,699,091 A * | 12/1997 | Bullock et al. | 347/19 |
| 6,036,179 A * | 3/2000 | Rensel | 267/64.11 |
| 6,282,475 B1 * | 8/2001 | Washington | 701/49 |
| 6,356,813 B1 * | 3/2002 | Sommer et al. | 701/1 |
| 6,369,529 B1 * | 4/2002 | McClintock et al. | 318/16 |
| 6,622,075 B1 * | 9/2003 | Reuschel et al. | 701/51 |
| 6,732,031 B1 * | 5/2004 | Lightner et al. | 701/31.4 |
| 7,103,460 B1 * | 9/2006 | Breed | 701/32.9 |
| 7,129,716 B2 | 10/2006 | Schroeder | |
| 7,251,551 B2 * | 7/2007 | Mitsueda et al. | 701/29.2 |
| 7,260,733 B2 * | 8/2007 | Ichikawa et al. | 713/375 |
| 7,319,397 B2 * | 1/2008 | Chung et al. | 340/572.4 |
| 7,319,925 B2 * | 1/2008 | Gisy et al. | 701/32.8 |
| 7,321,814 B2 * | 1/2008 | Kanda et al. | 701/29.6 |
| 7,349,770 B2 * | 3/2008 | Matsuzaki et al. | 701/1 |
| 7,444,210 B2 * | 10/2008 | Breed et al. | 701/1 |
| 8,060,282 B2 * | 11/2011 | Breed | 701/48 |
| 8,234,035 B2 * | 7/2012 | Iwagami et al. | 701/30.5 |
| 8,311,858 B2 * | 11/2012 | Everett et al. | 705/4 |
| 2001/0002814 A1 * | 6/2001 | Suganuma et al. | 340/5.74 |
| 2003/0176959 A1 * | 9/2003 | Breed | 701/36 |
| 2004/0054458 A1 * | 3/2004 | Reuschel et al. | 701/51 |
| 2004/0078128 A1 | 4/2004 | Dietzel et al. | |
| 2004/0239187 A1 | 12/2004 | Harada | |
| 2005/0065682 A1 * | 3/2005 | Kapadia et al. | 701/35 |
| 2006/0041350 A1 * | 2/2006 | Hoshaw | 701/36 |
| 2006/0119370 A1 | 6/2006 | Schroeder | |
| 2008/0125937 A1 * | 5/2008 | Decke et al. | 701/36 |
| 2009/0132114 A1 * | 5/2009 | Torsten | 701/36 |
| 2009/0164077 A1 * | 6/2009 | Kiessner-Haiden | 701/67 |
| 2010/0292889 A1 * | 11/2010 | Cahill et al. | 701/31 |
| 2011/0060501 A1 * | 3/2011 | Bruzy et al. | 701/36 |

FOREIGN PATENT DOCUMENTS

| | | |
|---|---|---|
| DE | 10238093 A1 | 3/2004 |
| DE | 10251632 A1 | 6/2004 |
| DE | 10259433 A1 | 7/2004 |
| DE | 10333651 A1 | 2/2005 |
| DE | 102005036959 A1 | 2/2007 |
| DE | 10200648255 A1 | 4/2008 |
| EP | 0434986 A2 | 7/1991 |
| EP | 1219867 A1 | 7/2002 |
| EP | 1488970 A1 | 12/2004 |
| JP | 2005247293 A | 9/2005 |

* cited by examiner

ELECTRICALLY ACTUATABLE MODULE OF A MOTOR VEHICLE AND METHOD FOR IDENTIFYING AN ELECTRICALLY ACTUATABLE MODULE OF A MOTOR VEHICLE

CROSS-REFERENCE TO RELATED APPLICATIONS

This application is a continuation and claims priority to U.S. application Ser. No. 12/997,780 filed Apr. 19, 2011 which is a National Stage entry of and claims priority to International Patent Application Serial No. PCT/EP2009/004492 filed Jun. 22, 2009. This application also claims priority to German Application No. 10 2008 030 092.6 filed Jun. 25, 2008. The entire contents of each above listed application is hereby incorporated herein by reference.

FIELD

The present invention relates to an electrically actuable module of a motor vehicle having at least one component including a non-volatile memory, wherein the component has a basic functionality characteristic for the component and required for the operation of the of the module. The invention furthermore relates to a method for identifying such an electrically actuable module.

BACKGROUND

A module of this kind can, for example, be a differential unit having a torque transfer clutch by which a direct distribution of a drive torque between two wheels of an axle of a motor vehicle takes place. The module can furthermore, for example, also be formed by a torque transfer clutch or by an actuator for a torque transfer clutch which serves for the direct distribution of the drive torque between a front axle and a rear axle in an all-wheel drive vehicle.

Such modules have to be able to be actuated with high precision. The existing tolerances are therefore individually determined for each produced module in the manufacture for the purpose of a calibration, with the module being divided into different variants or tolerance categories in accordance with a predetermined classification scheme. The respective determined variant of a specific module can thus be taken into account by an associated control unit of the vehicle to actuate the module with the desired precision.

A problem in connection with such a calibration and classification of electrically actuable modules is that the modules and the associated control units are sometimes installed in the vehicle independently of one another at the vehicle manufacturer's. A teach-in process therefore usually takes place after the installation of the module and of the control unit in which the respective current classification of the module used is communicated to the control unit and is stored therein so that it can actuate the module with the desired precision. If, for example, an exchange of the electrically actuable module or of the control unit takes place later in a service case, this teach-in process has to be carried out again so that the correct actuation of the module by the control unit is in turn ensured.

It has already been proposed to encode the respective classification of a module in an additional coded plug and to fasten it to the module. The coded plug is connected to the control unit by which the current classification is read out of the coded plug and decoded. A correct actuation of the module is then possible on the basis of the read out classification.

It is disadvantageous in this solution that an additional failure risk of the electrically actuable module arises on the basis of the coded plug formed as an additional component. The reading out, decoding and comparing of the classification stored in the coded plug with the classifications stored in the control unit is furthermore relatively complex to realize. It ultimately can also not be precluded that a coded plug is connected to the electrically actuable module and contains an incorrect classification so that the classification read out from the coded plug by the control unit is not correct.

SUMMARY

It is an object of the present invention to configure an electrically actuable module of the initially named kind so that it can be ensured in a simple and reliable manner that the electrically actuable module is in each case correctly actuated by the control unit. A method should furthermore be provided for the safe identification of such an electrically actuable module.

In accordance with the invention, this object is satisfied starting from an electrically actuable module of the initially named kind in that the memory includes a memory region not used for the realization of the basic functionality of the component, in that an identifier identifying the module with a preset probability is stored in the memory region and in that the identifier can be read out of the memory region of the component. A method in accordance with the invention is characterized in that an identifier identifying the module with a preset probability is read out of a memory region not used for the realization of the basic functionality of the component.

In accordance with the invention, it is thus not the respective classification of the electrically actuable module which is stored in a separate component, but rather an identifier identifying the module with a preset, sufficient probability is stored in a component of the module, with this component already being a component required for the basic function of the electrically actuable module.

The component is thus a component which is also present in a module not configured in accordance with the invention and has a basic functionality which is necessary for the basic operation of the module. In accordance with the invention, it is thus not an additional component which is used for the storage, but rather a component is used in which the possibility of a storage of an identifier is already inherently present, with the corresponding memory which is required for the realization of the basic functionality of the component including a memory region which is not used for the realization of this basic function. This memory region which is unused without a realization of the invention is used in accordance with the invention for the storage of the identifier of the module so that no additional module parts are required and thus no increase in the failure risk of the electrically actuable module is present.

A classification of the module is furthermore not stored in the memory region, but rather an identifier identifying the module with a preset probability. The identifier is selected in this respect so that the module can be identified with sufficient probability on the basis of the identifier. If, for example, the module is replaced in a service case, the exchange can be recognized on the basis of the identifier which is thereby likewise changed. In this case, the required steps can be carried out, for example a service routine can be performed in which the current classification of the new module is taught to the control unit. The classification which can be input manually to the control unit can, for example, be indicated at the housing of the electrically actuable module.

In accordance with an advantageous embodiment of the invention, a control unit for actuating the module is provided and is connected to the module, with the module being configured for transferring the identifier stored in the memory region to the control unit. The transfer can in this respect, for example, take place on the basis of a control signal output by the control unit. It is, however, also possible that the identifier is output by the module without application of an external control signal in that it is, for example, applied to a separate output line of the module. The identifier stored in the module can thus be transferred to the control unit and stored, for example in a teach-in mode, in the control unit and can be used in an operating mode for identifying the electrically actuable module. The control unit can for this purpose include a non-volatile memory for storing the identifier transferred by the module in the teach-in mode. In this teach-in mode, the identifier characterizing the module is thus transferred to the control unit and stored therein. It is generally also possible that the identifier is not transferred to the control unit by the module, but is rather, for example, input manually into the control unit and stored there in the teach-in mode.

The identifier stored in the control unit in the teach-in mode can then be compared in an operating mode with an identifier transferred to the control unit by the module during operation. For this purpose, the control unit can include a comparison section for comparing the identifier stored in the teach-in mode with an identifier transferred to the control unit by the module in an operating mode. In the operating mode, no storage of the transmitted identifier in the memory of the control unit thus takes place, but rather only a comparison of the currently transferred identifier with the identifier already stored in the control unit. In accordance with the invention, the identifier is thus read out of the memory region in the operating mode, is transferred to the control unit connected to the module for the actuation thereof and is compared by the control unit with an identifier stored in the control unit in the teach-in mode.

In accordance with an advantageous embodiment of the invention, the control unit includes an evaluation section by which an error signal can be generated when a difference is found by the comparison section between the identifier stored in the memory and the currently transferred identifier. The module can in particular be deactivated by the error signal.

In accordance with the invention, it is thus detected in the operating mode if the pairing of the module and of the control unit originally installed in the motor vehicle and coordinated with one another was changed in that either the module or the control unit or both elements were replaced. In each of these cases, the identifier stored in the control unit no longer coincides with the currently transferred identifier of the module so that the control unit generates the error signal and optionally deactivates the module.

Subsequently, in a service mode, a new teach-in process can be carried out in which the identifier of the currently used module is transferred to the control unit and is stored in its non-volatile memory. At the same time, for example, a classification indicated at the housing of the current module can be manually stored in the control unit so that the module and the control unit are coordinated with one another again after the end of the teach-in process and the termination of the service mode. In the further operation, the module used is again recognized by a comparison of the transferred identifier with the identifier stored in the control unit as the correctly associated module so that normal operation can be continued with a correct actuation of the module.

Only on a renewed replacement of one of the two elements (module or control unit) does a difference again arise between the identifier stored in the control unit and the identifier transmitted by the module so that an error signal is in turn generated by the control unit and a new service mode is necessary.

In accordance with an advantageous embodiment of the invention, the identifier is read out of the memory region and transferred to the control unit repeatedly at preset points in time, in particular after switching the module on and/or after receipt of a preset request signal. For example, in each case when the ignition of the motor vehicle is switched on, the identifier can be read out of the base unit and transferred to the control unit and compared with the identifier stored in the control unit. Since it can be assumed that the control unit or the module will only be replaced when the ignition is switched off, the check of the identifier transmitted by the currently used module with the identifier stored in the control unit is in each case suitable at the time of the switching on of the ignition of the motor vehicle to ensure a safe check that the module and control unit belong together.

In accordance with a further advantageous embodiment of the invention, the module is configured as a torque transfer clutch or as an actuator for a torque transfer clutch. The module can in this respect in particular be configured as a differential unit or as a transfer case. It is generally possible that the module is any desired other electrically actuable module which can be actuated by a control unit and in which an identification with a preset probability is required.

In accordance with a further advantageous embodiment of the invention, the component is configured as a sensor, in particular as a measured value sensor. The components can thus, for example, be configured as a pressure sensor such as is used in torque transfer clutches. In particular when the component includes a so-called ASIC (application specific integrated circuit), a non-volatile memory can be present in it which includes memory regions not used for the realization of the basic functionality of the component. They can then be used for realizing the invention. The component can generally be configured as any desired component required for the basic functionality of the electrically actuable module as long as it includes a non-volatile memory having a memory region not used for the realization of the basic functionality of the component.

In accordance with a further advantageous embodiment of the invention, the identifier is stored distributed in different memory regions of different components of the module, with none of the memory regions being used for the realization of the basic functionality of the respective component. If, for example, the memory region of the memory of an individual component is not large enough to store a sufficiently unambiguous identifier, the described distributed storage of the identifier in different memory regions of different components is possible. In this case, the failure risk and the complexity of the electrically actuable module is also not increased since only components required for the realization of the basic functionality are used.

In accordance with a further advantageous embodiment of the invention, the identifier is transferred as a digital numerical value. A very simple processing as well as a high process security is achievable by the use, in particular the storage and transfer as well as evaluation, as a digital numerical value.

In accordance with a further preferred embodiment of the invention, the identifier is formed by a random number. It is generally also possible that the identifiers of different modules are formed by running numbers. What is important for the formation of the identifier is only that a sufficiently large disambiguity and thus a sufficiently large probability is ensured for an unambiguous identification of the module by the identifier.

Further advantageous embodiments are set forth in the dependent claims.

DRAWINGS

Figure 2:
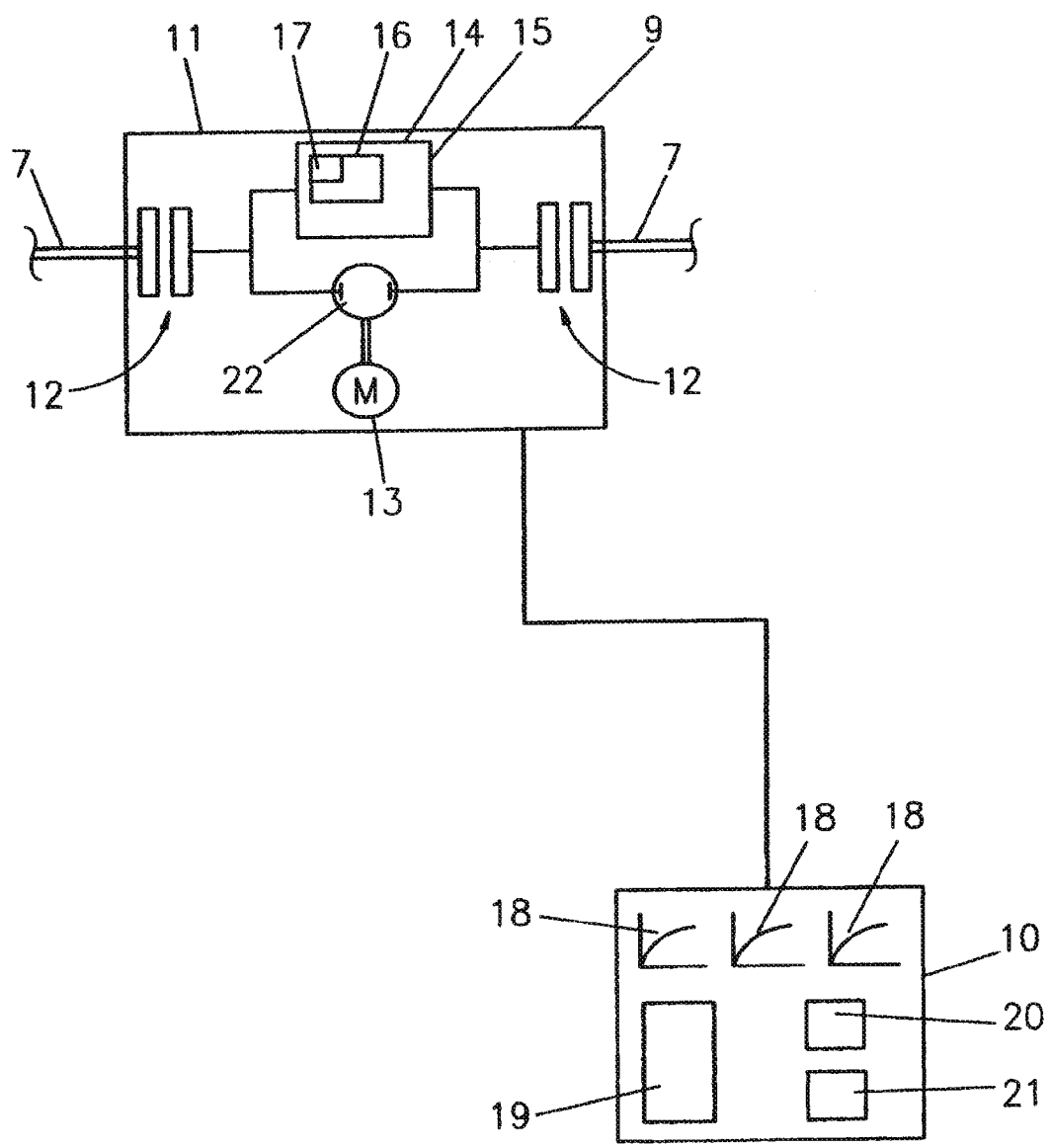

The invention will be described in more detail in the following with reference to embodiments and to the drawings; there are shown in these:

FIG. 1 a schematic representation of a part of a motor vehicle having an electrically actuable module configured in accordance with the invention; and FIG. 2 a schematic structure of an electrically actuable module configured in accordance with the invention having a control unit connected thereto.

DETAILED DESCRIPTION

A vehicle powertrain 1 is shown in FIG. 1 having a drive 2 which includes a power transmission path 3, an engine 4 and a transmission 5. The power transmission path 3 includes a drive shaft 6 which is driven by the transmission 5 and two half shafts 7 of which each is connected to a driven wheel 8. A differential unit 9 is arranged between the half shafts 7 and the drive shaft 6 and the drive torque transferred by the engine 4 to the drive shaft 6 can be transferred to one or both half shafts 7 by it. Whereas in FIG. 1, the basic structure of a vehicle with rear-wheel drive is shown, the invention can naturally also be applied to a motor vehicle having front-wheel drive or all-wheel drive.

The differential unit 9 is connected to a control unit 10 which actuates the differential unit 9 in dependence on a plurality of vehicle parameters to realize a so-called torque-vectoring operation (TV operation) and to distribute the drive torque delivered by the engine 4 as required to the driven wheels 8.

To determine the corresponding vehicle parameters, the control unit 10 is connected to a plurality of sensors 23, 24 which can include, for example, a yaw rate sensor 23, wheel speed sensors 24, a steering wheel angle sensor, not shown, and/or a steering angle sensor, not shown, as well as other suitable sensors such as lateral and longitudinal acceleration sensors. The driving parameters detected by the sensors are characteristic for a plurality of operating states, e.g. the yaw rate of the vehicle or the speed of the driven wheels 8. Based on the vehicle parameters determined by the sensors 23, 24, a differential control signal is generated by the control unit 10 which serves for the control of the differential unit 9 and in particular of an actuator arranged within the differential unit 9.

A very simplified schematic representation of the structure of the differential unit 9 is shown in FIG. 2 which forms an electrically actuable module 11 in accordance with the present invention as well as a representation of the control unit 10 connected thereto.

The module 11 includes two hydraulically actuable multidisc clutches 12 which are coupled to the half shafts 7 and which can be actuated via a fluid pump 22 driven by an electric motor 13 for the direct transfer of a torque. A pressure sensor 14 is furthermore provided by which the respective set hydraulic pressure can be measured, wherein, for example, the pressure is measured selectively in the left or right multidisc clutch 12 via shuttle valves, not shown. It is generally also possible to provide a plurality of corresponding pressure sensors 14. The pressure sensor 14 in this respect forms a component 15 of the electrically actuable module 11 which is required for the basic functionality of the module 11, namely the direct distribution of the torque to the multidisc clutches 12.

The pressure sensor 14 further includes a memory 16 in which values required for the tasks defined for its realization as a pressure sensor are stored. The memory 16, however, also includes a memory region 17 which is not required for the realization of the basic function of the pressure sensor and thus for the realization of the basic functionality of the component 11 and thus forms a region of the memory 16 not used for the basic function.

In accordance with the invention, an identifier is stored in an in particular digital form in the memory region 17 and can, for example, represent a random number or a running number and has a length to ensure an identification of the module 11 with a sufficient preset probability. This identification is, for example, already written to the memory region 17 in the production of the module 11 and is advantageously unchangeable thereafter.

To achieve a sufficient disambiguity, the identifier can, for example, be a digital number having a length of 16 bits so that the number of possible different identifiers amounts to 65,536. An identifier defined with a preset probability and identifying the module 11 can thus be generated by a corresponding large length of the identifier. If required, a larger or optionally also a smaller length can be used.

As can furthermore be recognized from FIG. 2, a plurality of characteristics 18 is stored in the control unit 10 (for example pressure/torque dependencies) which each correspond to different variants or classifications of modules 11. Each manufactured module 11 is assigned to one of the predefined classifications which is in each case represented by one of the characteristics 18. To ensure a correct actuation of the module 11 by the control unit 10, it is necessary that the respective characteristic 18 is used which corresponds to the current classification of the module 11 used.

On the installation of the module 11 as well as of the control unit 10 into a motor vehicle, the classification of the currently used module 11 is thus taught into the control unit 10 so that the correct characteristic 18 corresponding to the current module 11 is used by the control unit 10.

At the same time, the identifier stored in the memory region 17 is read out of the module 11 and is stored in a non-volatile digital memory 19 of the control unit 10 after the installation of the module 11 and of the control unit 10 and the corresponding setting of the control unit 10 to the correct classification. This first-time storage of the current identifier in the memory 19 takes place in a so-called teach-in mode and can take place via the control line of the module 11 or, for example, via a separate line.

After the first-time installation of the control unit 10 and of the module 11 and the concluded teach-in mode, the identifier identifying the used module 11 substantially without ambiguity is thus stored both in the memory region 17 of the module 11 and in the memory 19 of the control unit 10.

On every switching on of the ignition of the motor vehicle, a check is made whether the identifier stored in the memory region 17 of the module 11 coincides with the identifier stored in the memory 19 of the control unit 10. For this purpose, the control unit 10 includes a comparison section 20 by which the identifier stored in the memory 19 is compared for coincidence with the identifier read out from the memory region 17 of the module 11 after the switching on of the ignition. The identification can in this respect again take place via the control line of the module 11 or via a separate line. An evaluation section 21 is furthermore provided by which an error signal can be generated in the event of a difference between the two identifiers. This error signal can, for example, result in the switching off of the electrical module 11 as well as in the generation of a corresponding optical or acoustic error signal.

It is ensured in this manner that the module 11 is only put into operation with an unchanged association of the module 11 and control unit 10 originally coordinated with one another by which the correct use of the correct characteristic 18 is ensured.

If, in contrast, the module 11 or the control unit 10 has been replaced without a new coordination between these elements having taken place, on the next switching on of the ignition of the motor vehicle, a difference is found by the comparison section 20 between the identifier stored in the memory 19 of the control unit 10 and the identifier read out of the memory region 17 of the module 11 after the switching on of the ignition so that the module 11 is deactivated by the evaluation unit 21.

In order again to coordinate the module and the control unit 10 with one another, the classification of the currently used module 11 must first again be input into the control unit 10. This can, for example, take place in that the classification of the current module 11 is visibly applied to the housing outer side and can be manually input into the control unit 10 so that the control unit 10 selects the correct characteristic 18 for the further actuation of the module 11 on the basis of the input classification.

Subsequently, in a new teach-in mode, the identifier stored in the memory region 17 of the module 11 has to be transferred to the control unit 10 and has to be stored in the memory 19 there. From this time onward, the module 11 and the control unit 10 are again coordinated with one another.

A check can be made regularly and it can be ensured that neither the module 11 nor the control unit 10 were replaced via the repeating comparison of the identifier stored in the memory 19 of the control unit 10 with the identifier read out of the memory region 17 of the module 11.

Since the memory 16, and thus also the memory region 17, represents a part of the component 15 and since the component 15 is required for the basic functionality of the module 11, no additional component is required for identifying the module 11 and for checking in accordance with the invention the mutually coordinated elements (module 11 and control unit 10) so that the failure risk of the module 11 is not increased by the invention.

Whereas the invention has been described by way of example for a differential unit with which a torque can be distributed directly between two wheels of an axle, the invention can generally be applied to any desired electrically actuable modules which can be actuated via a control unit and in which a fixed association between the module and the control unit is important. This is, for example, also the case with transfer cases with which a corresponding torque can be distributed between a front axle and a rear axle of a motor vehicle, with here the actuation being able to take place, for example, via an electrically activatable actuator, for example an electric motor having a downstream step-down gear.

REFERENCE NUMERAL LIST 1 vehicle powertrain
2 drive
3 power transmission path
4 engine
5 transmission
6 drive shaft
7 half-shafts
8 wheels
9 differential unit
10 control unit
11 module
12 multidisk clutches
13 electric motor
14 pressure sensor
15 component
16 non-volatile memory
17 memory region
18 characteristics
19 non-volatile memory
20 comparison section
21 evaluation section
22 fluid pump
23 yaw rate sensor
24 wheel speed sensors

The invention claimed is:

1. An electrically actuatable module of a motor vehicle comprising:
    at least one component including a non-volatile memory,
    wherein the component has a basic functionality characteristic that is required for the operation of the module, the non-volatile memory includes a memory region not used for the realization of the basic functionality of the component, and an identifier identifying the module is stored in the memory region that can be read out of the memory region,
    wherein the electrically actuatable module is a torque transfer clutch or an actuator for a torque transfer clutch or
    the electrically actuatable module is configured as a transfer case, and
    wherein the component is configured as a sensor to measure a value.

2. The module in accordance with claim 1, wherein a control unit for actuating the module is provided and is connected to the module, and wherein the module is configured for transferring the identifier stored in the memory region to the control unit.

3. The module in accordance with claim 2, wherein the control unit includes a non-volatile memory for storing the identifier transferred by the module in a teach-in mode.

4. The module in accordance with claim 3, wherein the control unit includes a comparison section for comparing the identifier stored in the teach-in mode with an identifier transferred to the control unit by the module in an operating mode.

5. The module in accordance with claim 4, wherein the control unit includes an evaluation unit by which an error signal can be generated when a difference is found by the comparison section between the identifier stored in the memory of the control unit and the currently transferred identifier.

6. The module in accordance with claim 5, wherein the module can be deactivated by the error signal.

7. The module in accordance with claim 1, wherein the component is configured as a pressure sensor.

8. The module in accordance with claim 1, wherein the module is configured for automatically transferring the identifier at a preset time, in particular after at least one of switching on the module and receiving a preset request signal.

9. The module in accordance with claim 1,
wherein the component is configured as a pressure sensor.

10. The module in accordance with claim 1,
wherein the identifier is stored distributed in different memory regions of different components of the module, with none of the memory regions being used for the realization of the basic functionality of the respective component.

11. The module in accordance with claim 1,
wherein the module is configured for automatically transferring the identifier at a preset time, in particular after at least one of switching on the module and receiving a preset request signal.

12. The module in accordance with claim 1, wherein the component includes an application specific integrated circuit, and wherein the non-volatile memory including the memory region not used for the realization of the basic functionality of the component is present on the application specific integrated circuit.

13. A method for identifying an electrically actuatable module of a motor vehicle, comprising:
providing the module with at least one component including a non-volatile memory and having a basic functionality characteristic that is required for the operation of the module; and
reading out an identifier identifying the module from a memory region of the non-volatile memory that is not used for the realization of the basic functionality of the component,
wherein the electrically actuatable module is a torque transfer clutch or an actuator for a torque transfer clutch or
the electrically actuatable module is configured as a transfer case, and
wherein the component is configured as a sensor to measure a value.

14. The method in accordance with claim 13, further comprising:
connecting a control unit to the module for controlling actuation of the module; and
in an operating mode, the identifier is read out of the memory region, is transferred to the control unit, and is compared by the control unit with an identifier stored in the control unit in a teach-in mode.

15. The method in accordance with claim 14, wherein, in the teach-in mode, the identifier is read out of the memory region, is transferred from the module to the control unit, and is stored by the control unit.

16. The method in accordance with claim 14, wherein an error signal is generated by the control unit when a difference is found between the identifier transferred in the operating mode and the identifier stored in the teach-in mode.

17. The method in accordance with claim 16, wherein the module is deactivated when the error signal is generated.

18. The method in accordance with claim 14, wherein the identifier is repeatedly read out of the memory region and transferred to the control unit at preset points in time, in particular after at least one of switching on the module and receipt of a preset request signal.

19. The method in accordance with claim 13, wherein respective stored part identifiers are read out of memory regions of different components of the module and the identifier is generated from the part identifiers, with none of the memory regions being used for the realization of the basic functionality of the respective component.

20. An electrically actuatable module of a motor vehicle comprising:
a component with a basic functional characteristic required for operation of the module, the component includes memory having a memory region that is not used for the realization of the basic functionality of the component and where an identifier identifying the module is stored, the identifier can be read out of the memory region of the component and transferred to a control unit connected to the module and provided for actuating the module; and
wherein the electrically actuatable module is a torque transfer clutch or an actuator for a torque transfer clutch or
the electrically actuatable module is configured as a transfer case, and
wherein the component is configured as a sensor to measure a value.

21. The module in accordance with claim 20 wherein the control unit includes a non-volatile memory for storing the identifier transferred by the module during a teach-in mode, and a comparison section for comparing the identifier stored during the teach-in mode with an identifier transferred to the control unit by the module in a subsequent operating mode.

22. An electrically actuatable module in combination with a control unit for use in a motor vehicle and which is assigned one of a plurality of predefined classifications, the module includes a component required for basic functionality of the module and which has memory required for realization of the basic function of the component, the memory including a memory region not used for the basic function of the component and which stores a numeric identifier used to identify the module, wherein the control unit controls actuation of the module and stores a plurality of operational characteristics which correspond to the plurality of predefined classifications, wherein upon connection of the control unit to the module the specific classification assigned to the module is taught into the control unit and the corresponding operation characteristic to be used by the control unit in controlling actuation of the module is selected, the identifier is read out of the memory region of the component and is stored in a non-volatile memory of the control unit during a teach-in mode, and during a subsequent operating mode the identifier is read out of the memory region of the component and transferred to the control unit for comparison to the identifier stored in the non-volatile memory from the teach-in mode,
wherein the electrically actuatable module is a torque transfer clutch or an actuator for a torque transfer clutch or
the electrically actuatable module is configured as a transfer case, and
wherein the component is configured as a sensor to measure a value.

* * * * *